United States Patent

Tao et al.

[11] Patent Number: 5,901,059
[45] Date of Patent: May 4, 1999

[54] METHOD AND APPARATUS FOR CONTROLLING A PROCESS USING ADAPTIVE PREDICTION FEEDBACK

[76] Inventors: Kuoting Mike Tao, Campbell; Ramesh Balakrishnan, Palo Alto, both of Calif.

[21] Appl. No.: 08/713,863

[22] Filed: Sep. 13, 1996

[51] Int. Cl.$^6$ ................................................ G05B 13/02
[52] U.S. Cl. ........................................ 364/149; 364/164
[58] Field of Search .................................. 364/150, 152, 364/153, 164, 165, 149, 151

[56] References Cited

U.S. PATENT DOCUMENTS

| | | | |
|---|---|---|---|
| 3,610,899 | 10/1971 | Dahlin | 235/151.35 |
| 3,619,360 | 11/1971 | Persik, Jr. | 162/258 |
| 4,368,510 | 1/1983 | Anderson | 364/151 |
| 4,407,013 | 9/1983 | Arcara et al. | 364/149 |
| 4,578,747 | 3/1986 | Hideg et al. | 364/151 |
| 4,602,326 | 7/1986 | Kraus | 364/158 |
| 4,630,189 | 12/1986 | Ohmori et al. | 364/150 |
| 4,646,226 | 2/1987 | Moon | 364/176 |
| 4,707,779 | 11/1987 | Hu | 364/148 |
| 4,805,126 | 2/1989 | Rodems | 364/571.01 |
| 4,814,968 | 3/1989 | Fukumoto | 364/150 |
| 4,893,262 | 1/1990 | Kalata | 364/567 |
| 5,121,332 | 6/1992 | Balakrishnan et al. | 364/151 |
| 5,170,935 | 12/1992 | Federspiel et al. | 236/44 |
| 5,198,984 | 3/1993 | Yamaguchi et al. | 364/474.3 |
| 5,498,943 | 3/1996 | Kimoto et al. | 318/601 |
| 5,539,634 | 7/1996 | He | 364/158 |
| 5,609,136 | 3/1997 | Tuken | 123/357 |
| 5,633,800 | 5/1997 | Bankert et al. | 364/474.19 |

OTHER PUBLICATIONS

"A Linear Programming Approach to Constrained Multivariable Process Control" by C. Brosilow et al., Control and Dynamic Systems, vol. 27, system Identification and Adaptive Control, 1988, Academic Press, Inc., pp. 141, 148 and 149.

"A Simple Adaptive Smith–Predictor for Controlling Time–Delay Systems" by A. Terry Bahill, Control Systems Magazine, May 1983, pp. 16–22.

"Theory and Problems of Feedback and Control Systems" by Joseph J. Distefano, III, Ph.D et al, 1967, McGraw–Hill, Inc., Chapter 2, pp. 13 and 14.

"Multivarible Internal Model Control for a Full–Scale Industrial Distillation Column," by J.M. Wassick and R. Lal Tummala, IEEE Control Systems Magazine, 1989, pp. 91–96.

"Method for Automatic Adaptation of the Time Constant for a First Order Filter", from the Industrial and Engineering Chemistry Research, No. 29, 1991, pp. 275–277.

A one page description entitled "4.4 Dahlin Design" from p. 76—Design.

*Primary Examiner*—Paul P. Gordon

[57] ABSTRACT

The present invention is directed to a method and apparatus for controlling a process which may include long process delays, using an internal model-based control strategy wherein any external disturbances are effectively taken into account in a manner which results in a stable, predictable output. In accordance with exemplary embodiments, rather than using a mismatch signal $\epsilon$ as a feedback signal to address mismatches due to both modelling errors and to any external disturbance component, exemplary embodiments feedback an adaptive prediction of the mismatch signal. In accordance with exemplary embodiments, the adaptive, predicted mismatch signal possesses a value which takes into account the process time delay, or the process time delay plus some additional delay, to allow time for the control system to respond.

18 Claims, 7 Drawing Sheets

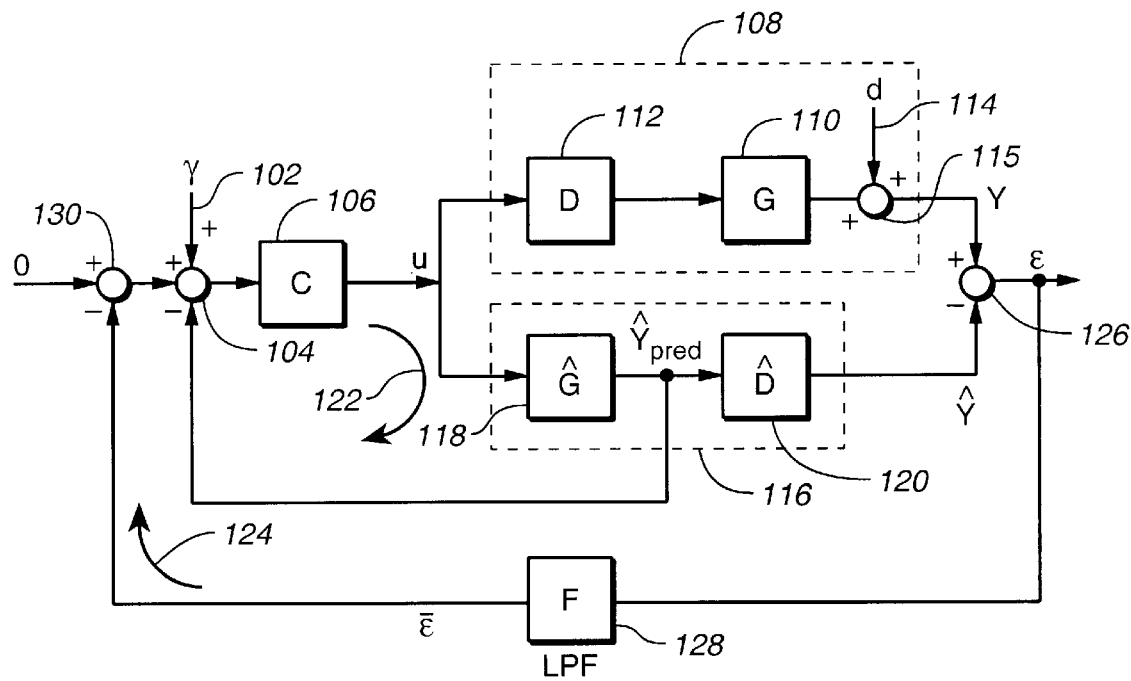
FIG._1
(PRIOR ART)
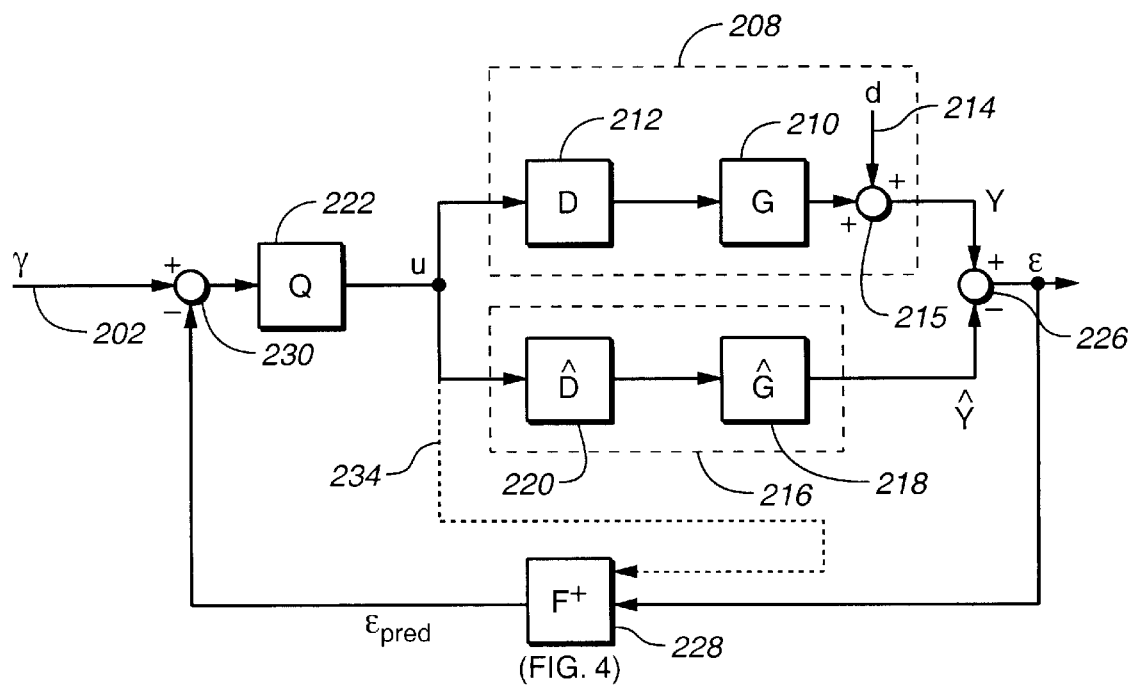
FIG._2

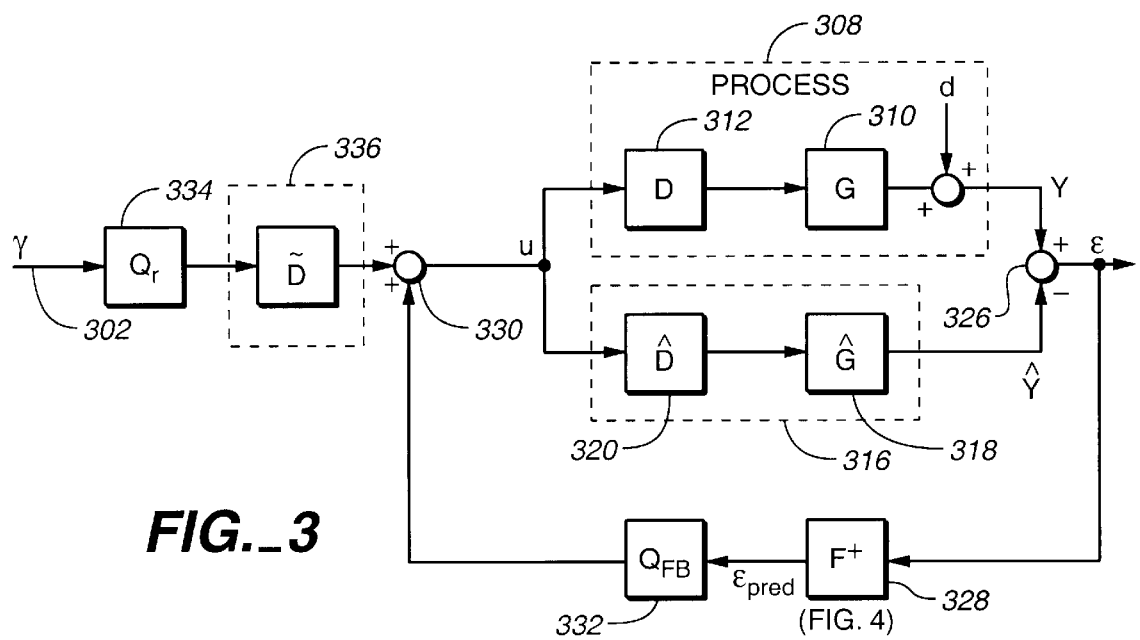
*FIG._3*
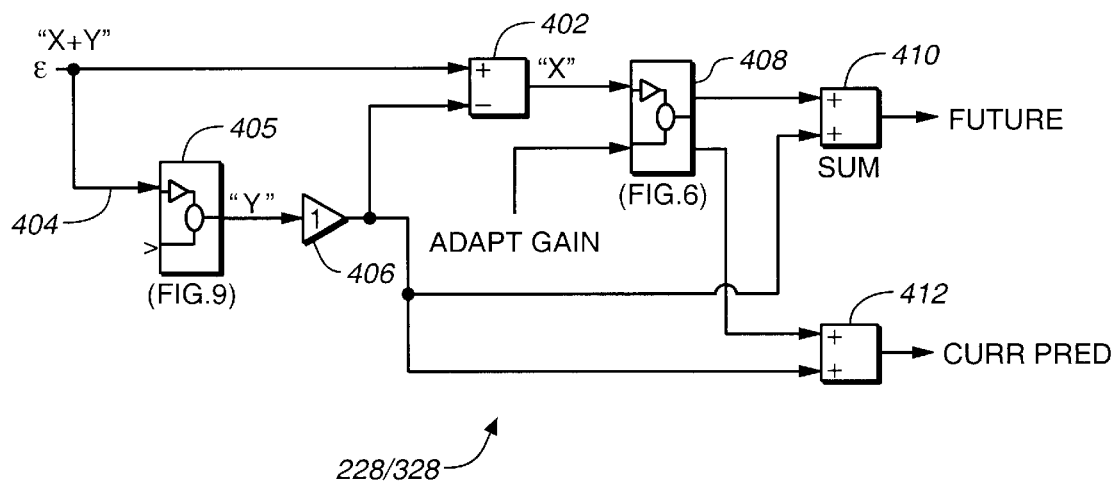
*FIG._4*

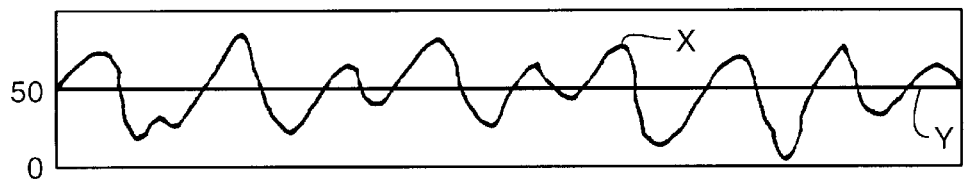
FIG._5A
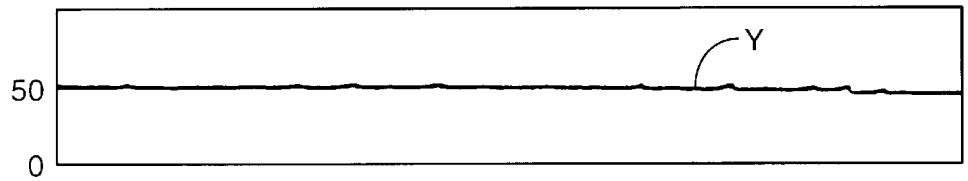
FIG._5B
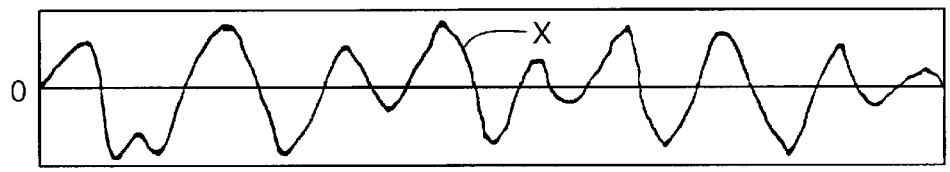
FIG._5C
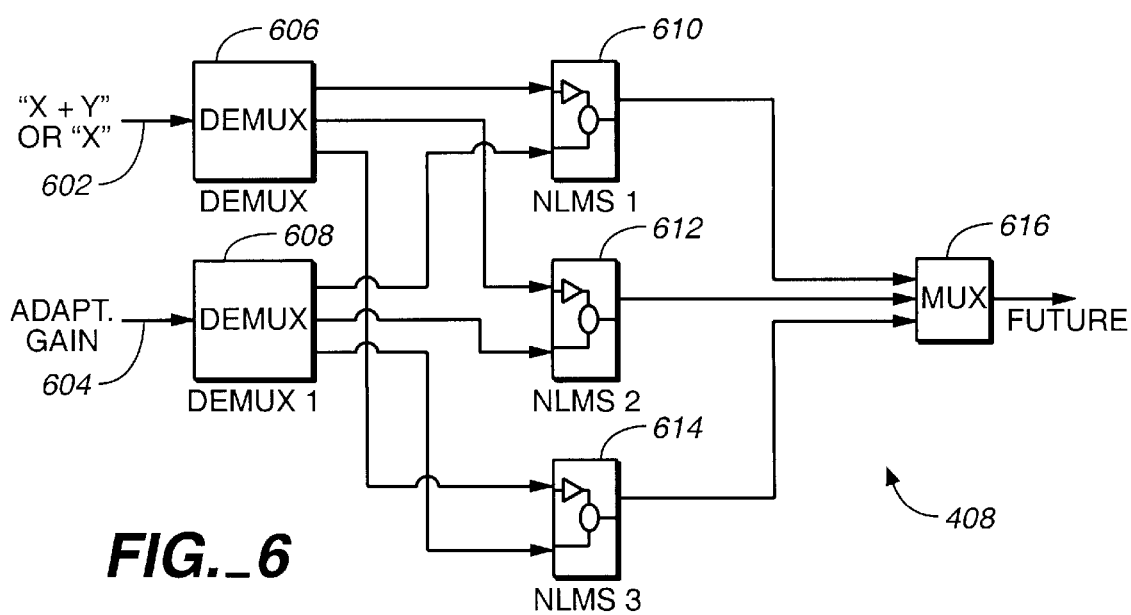
FIG._6

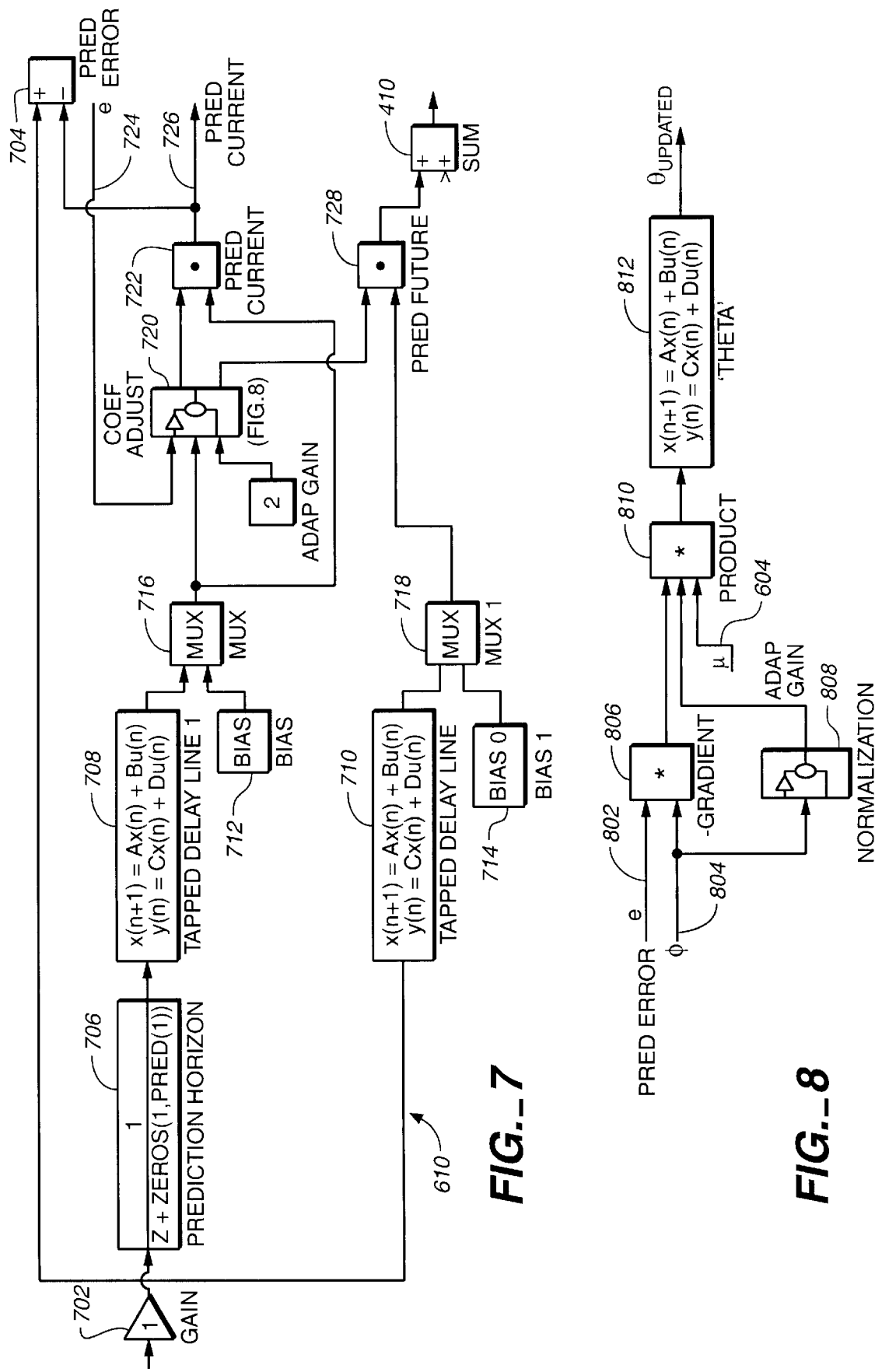
FIG._7
FIG._8

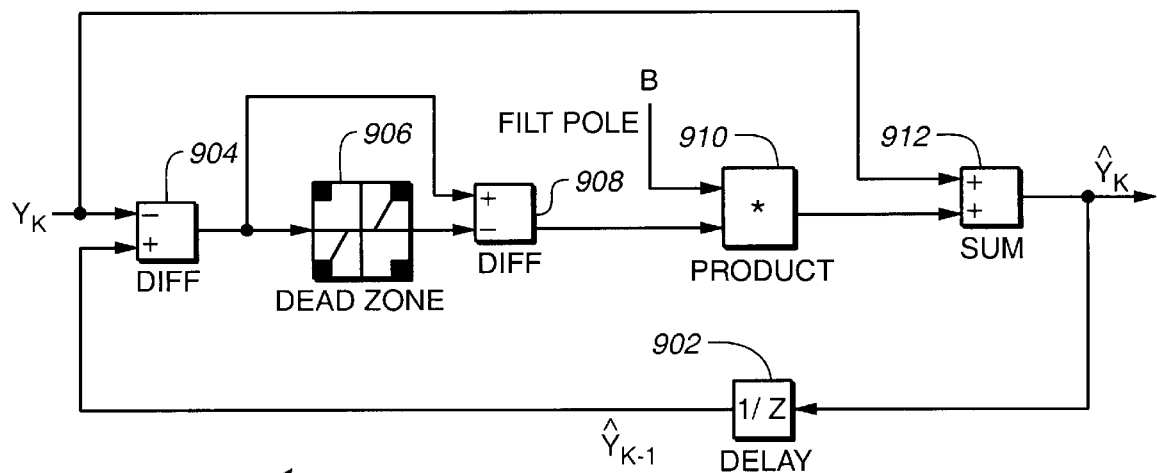
FIG._9A
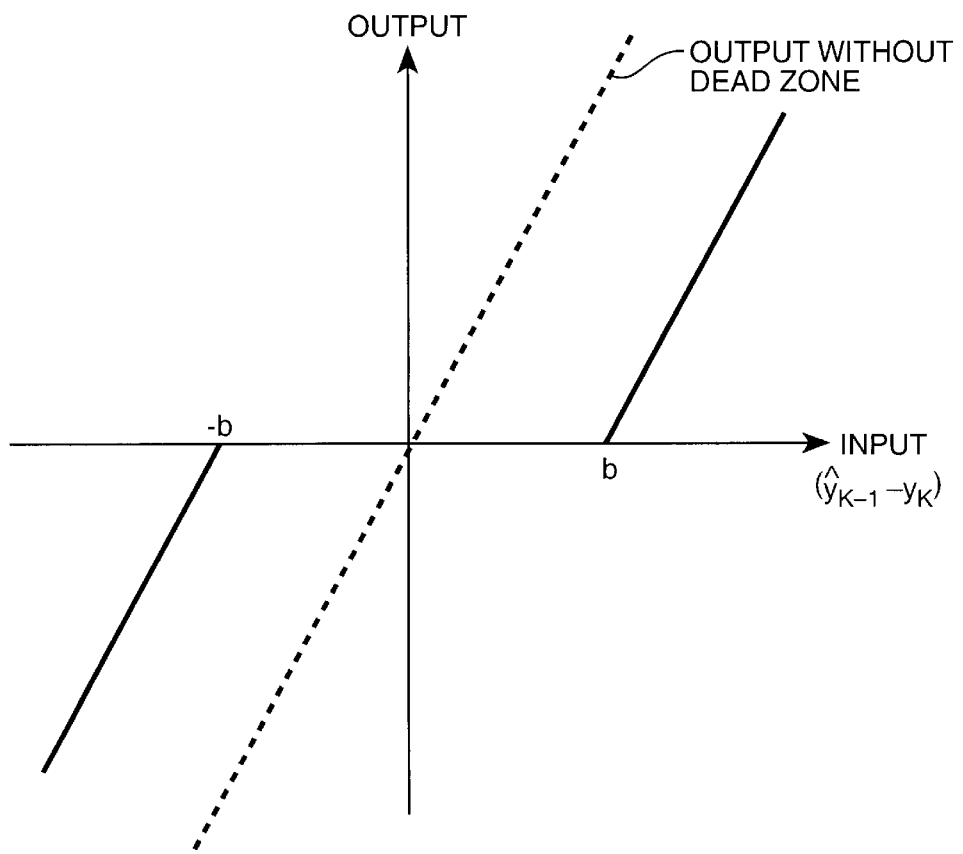
FIG._9B

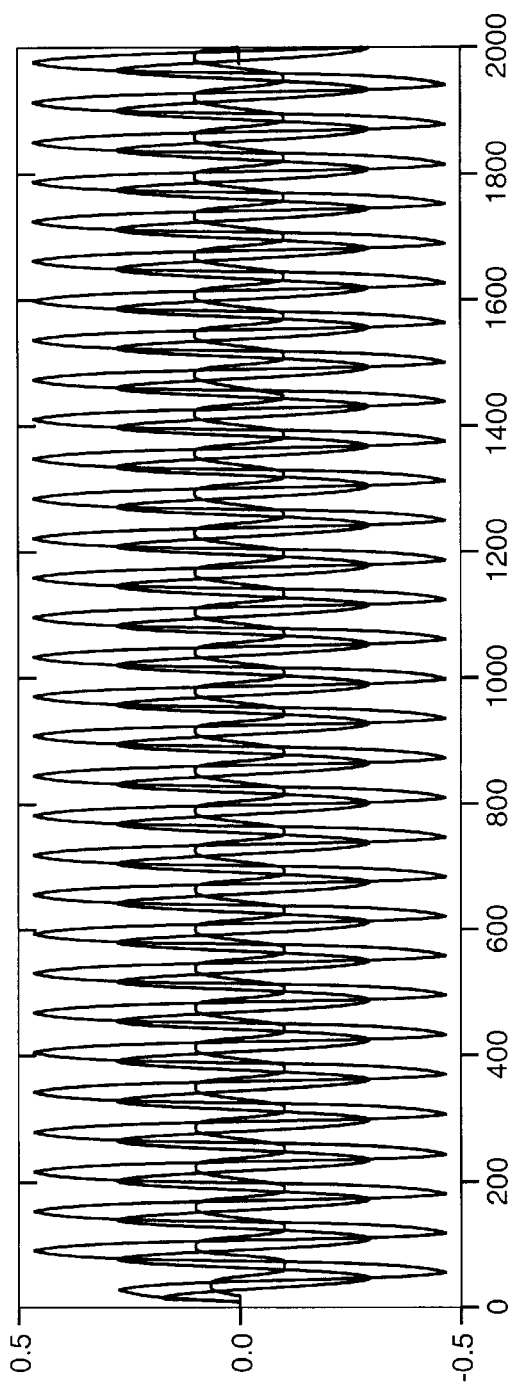
FIG._10A
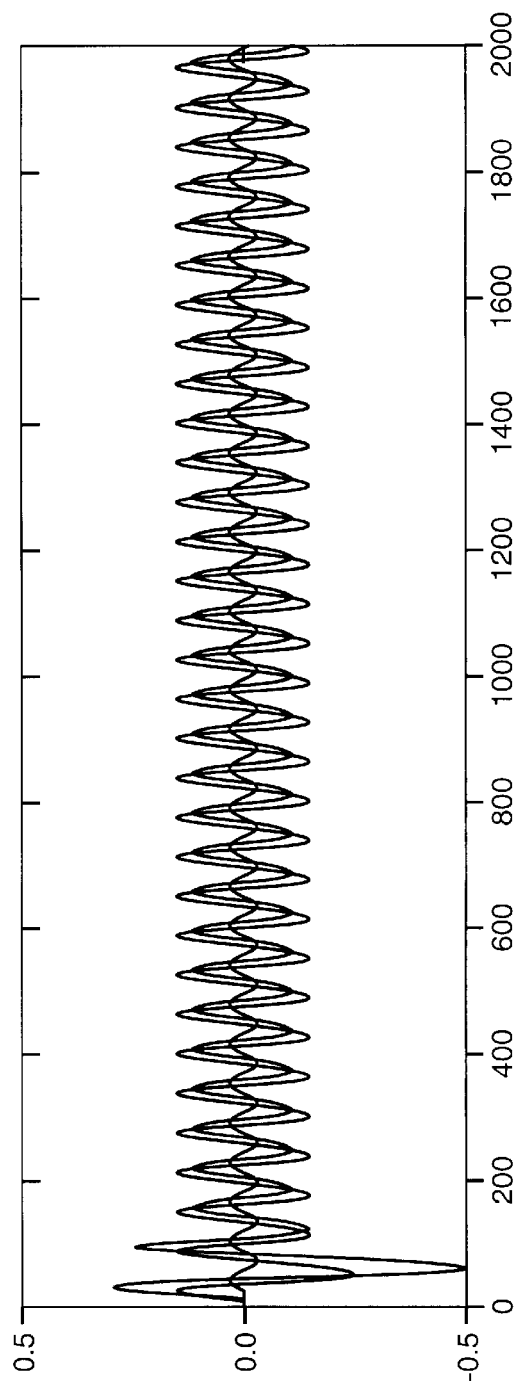
FIG._10B

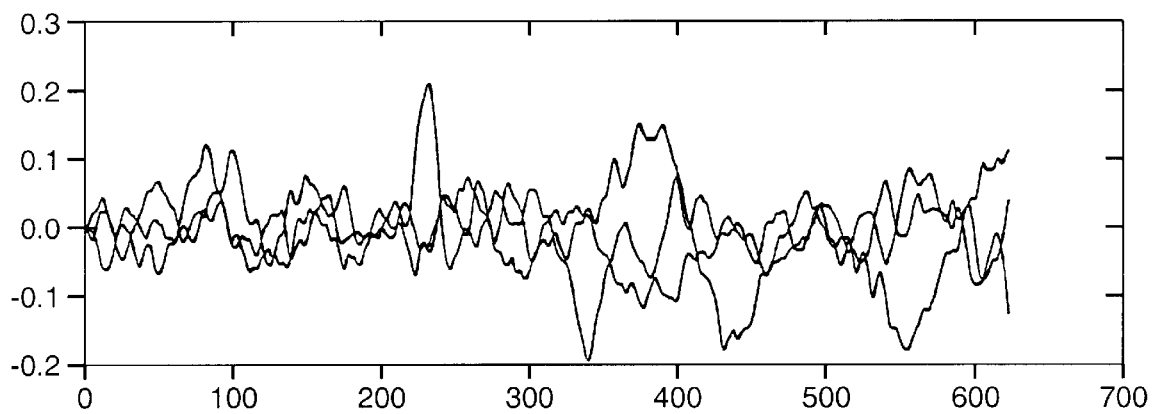
FIG._11A
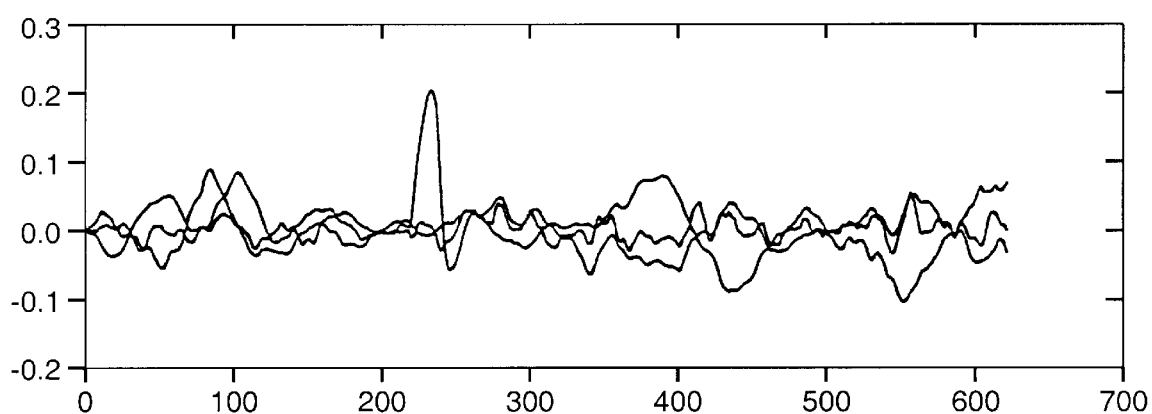
FIG._11B

METHOD AND APPARATUS FOR CONTROLLING A PROCESS USING ADAPTIVE PREDICTION FEEDBACK

BACKGROUND OF THE INVENTION

1. Field of the Invention

The present invention relates generally to control systems, and more particularly, to control systems which employ internal-model based control to account for time delays of a process being controlled.

2. State of the Art

Control systems which employ internal model-based control are known. For example, U.S. Pat. No. 5,121,332 (Balakrishnan et al) discloses a control system wherein an internal model-based control is used. Further, a document entitled "A Linear Programming Approach To Constrained Multivariable Process Control" by C. Brosilow and G. Q. Zhao (*Control and Dynamic Systems, Ed. by C. T. Leondes, Vol. 27: System Identification and Adaptive Control*, Academic Press, Inc., 1988) discloses a control system wherein an internal model-based control is used. The control systems described in these documents use an internal model control (MC) structure, such as the known Smith Predictor, for controlling processes with long time delays.

Controlled processes which incorporate long time delays can be considered to include two general components: (1) a dynamic gain, or transfer function, component of the overall process (absent any process time delays); and (2) the time delay component of the process. When a setpoint reference is applied directly to the process in an open-loop fashion, the process often responds with a time delay and with a steady-state amplitude different from the setpoint commanded. This is known as the bias problem.

Prior to the inclusion of internal model-based control, the bias problem was addressed by including direct feedback of the output signal to a comparator which also received the setpoint reference. The error between the setpoint reference and the output was then supplied to a controller having an integration function. This integration function was effective in erasing bias of the output signal relative to the input signal. However, for processes having long time delays, the error signal produced by the comparator existed for significant periods of time. The integration of the error signal over this relatively long period of time resulted in the process overshooting the desired setpoint reference, leading to an unstable, oscillatory output.

Internal model-based control was developed to address the unstable, oscillatory output associated with the use of direct feedback in a process control. Referring to FIG. 1, a controller which incorporates a Smith Predictor as an internal model-based controller is illustrated. In the FIG. 1 illustration, a setpoint reference 102, labelled "r", is supplied to a three input comparator 104. An output of the comparator 104 is supplied to a controller 106. The controller includes the integration feature described previously for addressing bias, and produces an output control signal labelled "u".

The control signal "u" is supplied to the control process represented by dashed lines 108. As mentioned previously, the process 108 can be considered to include two components: (1) the dynamic gain, or transfer function, component 110 labeled as a gain "G"; and a delay component 112 labelled "D". Because the process 108 is a real time process which is susceptible to environmental disturbances, an output from the dynamic gain component 110 is illustrated as being input to an adder 115 which receives an external disturbance component 114, labelled "d". The process output is a controlled variable labelled "y".

The components described above with respect to FIG. 1 constitute a conventional open loop control process. Prior to the use of a Smith Predictor with internal model-based control, the output signal "y" would constitute the feedback signal compared with the setpoint reference "r" to generate an error signal for controlling the process. However, as mentioned previously, such use of direct feedback may result in an unstable and oscillatory output signal "y".

To address the foregoing instabilities, the FIG. 1 illustration includes a Smith Predictor, configured as an internal model 116 of the process 108. The internal model 116 is a theoretical model of the process 108. The internal model 116 is illustrated as including two components: (1) a model dynamic gain component 118 labelled "$\hat{G}$"; and (2) a model delay component 120 labelled "$\hat{D}$". The model dynamic gain component 118 produces a predicted value "$\hat{y}_{pred}$" of the control variable "y". This predicted value constitutes a prediction of the value of "y" a set number of time units (e.g., $\hat{D}$ time units) into the future.

The model delay component 120 models the delay component 112, and produces an output labelled "$\hat{y}$" which is intended to be very close to the process output "y". In practice, where the external disturbance component "d" is negligible, the internal model 116 can be empirically developed to produce an output "$\hat{y}$" which is very close to the actual process output "y". Thus, the control signal "u" is supplied to two portions of the FIG. 1 illustration: (1) the actual process being controlled; and (2) the internal model, which receives the control signal in parallel with the process 108.

To address control system instabilities, an inner feedback loop 122 is provided without inclusion of time delay model $\hat{D}$. This inner feedback loop supplies the predicted value "$\hat{y}_{pred}$", representing a prediction of "y" $\hat{D}$ time units into the future, back to the comparator 104 where it is subtractively combined with the setpoint reference 102. Because the signal "$\hat{y}_{pred}$" is not supplied through the model delay component 120, it tracks changes in the control signal "u" very quickly. Thus, the inner feedback loop 122 supplies feedback almost immediately for correcting the control signal "u" and thereby avoiding oscillation in the control signal due to overshoot caused by time delay.

The FIG. 1 controller also includes an outer feedback loop 124 which feeds back an error, or mismatch signal, labelled $\epsilon$. The mismatch signal $\epsilon$ is generated by comparing the actual process output "y" and the predicted value "$\hat{y}$" in a comparator 126. The mismatch signal $\epsilon$ is supplied to a low pass filter 128. The low pass filter 128 is configured with a cutoff frequency that corresponds to the desired bandwidth of process operation, and produces a filtered mismatch signal labelled $\bar{\epsilon}$. The filtered mismatch signal $\bar{\epsilon}$ is supplied to a comparator 130, wherein it is subtractively combined with a mismatch reference signal.

As those skilled in the art will appreciate, during ideal conditions, the internal model 116 will correspond identically to the process 108. As such, changes in the control signal "u" will be reflected equally in changes of the process output "y" and the predicted process output "$\hat{y}$". The mismatch signal $\epsilon$ will therefore ideally be zero during operation, as will the output from comparator 130, provided that the external disturbance "d" does not exist.

The control system of FIG. 1 works well if the internal model 116 is closely matched to the process and if there are no external disturbances "d". That is, the inner loop prevents the buildup of oscillations, while the outer feedback loop 124 corrects for long term (low frequency) mismatches between the internal model 116 and the actual process 108. However, difficulties may arise when external disturbances, as represented by the external disturbance component "d", exist. In this case, the mismatch signal $\epsilon$ will take on a value which is not due to inaccuracies in the internal model 116, but rather to periodic and/or random disturbances to the process. Although long term (slow) disturbances can be addressed effectively with the FIG. 1 controller, fast varying external disturbances cannot be properly addressed. In fact, they may be amplified by the feedback loop.

More particularly, values of $\epsilon$ due to fast changing external disturbances result in the output from comparator 130 taking on a value which is intended to cancel the effect of the external disturbance component "d". However, because of the time delay included in the process 108 and the external model 116, the outer feedback loop can only correct for very low frequency disturbances. High frequency disturbances will likely take on (very) different values by the time the corrective control actions show effect on the delayed response. The net effect may be an amplification of the disturbance "d".

Although the aforementioned Broslow et al document describes a control system which includes a "predictor" in a feedback path, the system described in this document does not adequately address the problems described above. Rather, at best, this document describes using currently observed external disturbances as a feedback, and making an assumption that these disturbances will not change over the time period associated with the prediction interval. In other words, the "predictor" is not a predictor at all, but rather, uses the current disturbance as an estimate of what a future disturbance will be.

Accordingly, it would be desirable to develop a control apparatus and method which includes internal model-based control to account for long process delays, while effectively taking any external disturbance components into account in a manner which produces a stable, predictable output.

SUMMARY OF THE INVENTION

The present invention is directed to a method and apparatus for controlling a process which may include long process delays, using an internal model-based control strategy wherein any external disturbances are effectively taken into account in a manner which results in a stable, predictable output. In accordance with exemplary embodiments, rather than using a mismatch signal $\epsilon$ as a feedback signal to address mismatches due to both modelling errors and to any external disturbance component, exemplary embodiments feedback an adaptive prediction of the mismatch signal. In accordance with exemplary embodiments, the adaptive, predicted mismatch signal possesses a value which takes into account the process time delay, or the process time delay plus some additional delay, to allow time for the controlled process to respond. That is, the feedback control action is based on a predicted future value of $\epsilon$.

Generally speaking, exemplary embodiments relate to a method and apparatus for controlling a process comprising: means for receiving at least one setpoint reference signal; means for modeling a process to be controlled, and for producing a predicted process output signal in response to said at least one setpoint signal; and means for producing an adaptive prediction feedback signal as a predicted difference between said predicted process output signal and an actual process output signal.

BRIEF DESCRIPTION OF THE DRAWINGS

The present invention can be further understood with reference to the following description and the appended drawings, wherein like elements are provided with the same reference numerals. In the drawings;

FIG. 1 illustrates a conventional control system having an internal model-based control;

FIG. 2 illustrates an exemplary control system in accordance with the present invention, wherein internal model-based control is used in conjunction with adaptive prediction feedback;

FIG. 3 illustrates an alternate exemplary embodiment of the present invention as applied to an exemplary control system using a two degree-of-freedom internal model-based control;

FIG. 4 illustrates an exemplary embodiment of an adaptive predictor for use in conjuncion with exemplary control systems in accordance with the present invention;

FIGS. 5A, 5B and 5C illustrate exemplary waveforms associated with a mismatch signal, and the processing thereof, in accordance with an exemplary embodiment of the present invention;

FIG. 6 illustrates an exemplary embodiment of an adaptive prediction block in accordance with the present invention;

FIG. 7 illustrates an exemplary embodiment of a normalized least mean square processor of the exemplary FIG. 6 embodiment;

FIG. 8 illustrates an exemplary embodiment of a coefficient adjusting block of the exemplary FIG. 7 embodiment; and FIGS. 9A and 9B illustrate exemplary embodiments of an optional slow/fast filter for use in conjunction with the exemplary FIG. 4 embodiment when an option ability to address steady state changes in a mismatch is desired;

FIGS. 10A and 10B illustrate a comparison of the reduction in oscillation achieved in control systems which incorporate adaptive prediction feedback in accordance with the present invention versus control systems which do not; and FIGS. 11A and 11B illustrate an ability of the exemplary embodiments of the present invention to achieve reduced actuator activity.

DETAILED DESCRIPTION OF THE PREFERRED EMBODIMENTS

FIG. 2 illustrates an exemplary control system in accordance with the present invention. In FIG. 2, an input is provided for receiving at least one setpoint reference signal 202, labelled "r". As those skilled in the art will appreciate, the setpoint reference 202 can be a scaler or vector value. For example, the setpoint reference "r" can include setpoints for any number of controlled variables.

Where the control system is used, for example, to control a paper making process, the setpoint reference can include any one or more parameters associated with the control of that process. Control variables typically associated with a paper making process include, for example, basis weight, moisture content and ash.

The setpoint reference 202 is processed into a control signal "u" (which can also be a scaler or vector value) via an inner feedback loop 222, labelled "Q". The inner feedback 222 generally corresponds to the inner feedback loop 122 of FIG. 1, but for the sake of simplicity has been represented as block "Q". The inner feedback loop 222 thus includes a controller in the forward path. The forward path is in parallel with a feedback loop having a model dynamic gain component included therein. Thus, the inner feedback loop 222 can be considered to include controller 106 of FIG. 1 in parallel with a feedback path that includes the model dynamic gain component 118. A comparator, such as comparator 104 of FIG. 1, is also included in the inner feedback 222 for subtractively combining the output of the model dynamic gain component 118 with the setpoint-derived input to the inner feedback loop 222 (note that the setpoint-derived input to the inner feedback loop 222 is the output of a comparator 230). As with loop 122 of the FIG. 1 embodiment, the inner feedback loop 222 provides relatively immediate response to changes in the control signal "u", to thereby reduce the occurrence of oscillations due to the exclusion of time delay in the (inner) loop.

As with the FIG. 1 control system, the control system of FIG. 2 supplies the control signal "u" to two locations: (1) the process 208 to be controlled; and (2) an internal model 216 used to model the process. The process 208 can be considered to include a dynamic gain component 210 and a delay component 212, as well as an external disturbance component 214 labelled "d" (which is graphically illustrated as being input to the process via an adder 215). The process 208 produces the process output signal "y".

The internal model 216 includes a model dynamic gain component 218 and a model delay component 220. As those skilled in the art will appreciate, the model dynamic gain component 218 which is included in the internal model 216 is the same model dynamic gain component which is incorporated in the inner feedback loop 222. That is, the model dynamic gain component is included in both the internal model 216 and the inner feedback loop 222 to simplify the following discussion by enabling better correlation of the FIG. 2 embodiment to an alternate embodiment of FIG. 3. Of course, if desired, the inner feedback loop 222, the process 208 and the internal model 216 can be illustrated in the manner shown in FIG. 1. The internal model 216 of FIG. 2, like that of FIG. 1, produces the predicted process output signal "ŷ".

In accordance with exemplary embodiments of the present invention, an adaptive prediction feedback signal $\epsilon_{pred}$ is produced as a predicted difference between the predicted process output signal "ŷ" and the actual process signal "y" (i.e., a value of E predicted to occur at some point in the future). This is an important feature of FIG. 2. More particularly, a comparator 226 produces a mismatch signal $\epsilon$ which is processed into an adaptive prediction feedback signal $\epsilon_{pred}$ via an adaptive predictor 228. A comparator 230 subtractively combines the setpoint reference 202 with the adaptive prediction feedback signal.

The adaptive predictor 228, labelled "F+" in FIG. 2, produces a prediction of the mismatch signal $\epsilon$ to minimize or eliminate oscillations in the value of $\epsilon$ produced by the comparator 226 as a result of external disturbances "d". An adaptive predictor in accordance with exemplary embodiments of the present invention can address oscillation which would result from any periodic (e.g., sinsoidual) noise and/or random noise. Exemplary embodiments of the adaptive predictor effectively identify and predict any repetitive patterns which influence the control system as an external disturbance.

Further, exemplary embodiments more efficiently control process actuators used in the process 208, regardless of whether the external disturbances are periodic, random or any combination of the two. With an amount of actuator movement equal to or less than that of control systems which incorporate internal model-based control but which do not include the adaptive predictor 228, a significant reduction in process output variations can be achieved if the disturbances possess repetitive, predictable patterns. Alternately, inclusion of adaptive prediction feedback in accordance with exemplary embodiments of the present invention produces comparable, or better control of process variations, but with a significant reduction in actuator activity.

Referring to the exemplary FIG. 2 embodiment, those skilled in the art will appreciate that the adaptive predictor 228 produces a prediction of the external disturbance component which will occur at some time in the future. It can often be assumed that the model dynamic gain component 218 and the model delay component 220 can be closely matched to the actual dynamic component 210 and the actual delay component 212 of the process being controlled, and will remain so during operation. If this is not the case, an optional signal path 234 can be used to modify the adaptive prediction feedback signal as a function of the control signal, u, as well. Such model mismatches can be predicted in a manner similar to that used to predict external disturbances.

Where model mismatches are relatively small, the adaptive prediction feedback signal $\epsilon_{pred}$ will be largely determined as a function of the external disturbance component 214. In this case, the value $\epsilon_{pred}$ is independent of controller actuation due to the control signal "u". Thus, the actual value of the control signal "u" plays an insignificant role in the determination of the adaptive prediction feedback signal unless a significant mismatch exists due to an improper or dynamically changing process model. In such cases, "u" may be introduced as an additional input to the preductor.

Of course, those skilled in the art will appreciate that the use of the adaptive prediction feedback in the general configuration of the FIG. 2 control system is by way of-example only, and that numerous variations exist. For example, FIG. 3 illustrates a variation of the FIG. 2 control system wherein a two degree-of-freedom internal model-based control is incorporated into the control system. A two degree-of-freedom internal model-based control system is, for example, described in co-pending U.S. application Ser. No. (Attorney Docket No. 018028-173) entitled "METHOD AND SYSTEM FOR CONTROLLING A MULTIPLE INPUT/OUTPUT PROCESS WITH MINIMUM LATENCY VARIABLES" and filed concurrently herewith, the contents of which are hereby incorporated by reference in their entirety.

Exemplary embodiments of a two degree of freedom internal model-based controller separate the components included in the inner feedback 222 of FIG. 2 into two separate control functions: (1) a first control function 334 labelled "$Q_r$" for controlling system response to changes in the setpoint reference "r"; and (2) a second control function 332 labelled "$Q_{FB}$" for responding to changes in the feedback signal $\epsilon$. As described in the aforementioned co-pending application, a delay unifier 336 labelled "D̂" is used to unify the delays associated with the multiple input variables when the setpoint reference 302 is configured as a vector. As described in the co-pending application, the delay unifier introduces a delay to the control variable of the setpoint reference 302 having the shortest delay to render it comparable to the delay associated with the control variable of the setpoint reference 302 having the longest delay. In other words, as a result of the delay unifier 336, all controlled variables will have substantially the same delay associated with them, to render processing blocks in the internal model 316 permutable.

The exact manner in which the delay unifier operates does not form a portion of the present invention, and a more detailed description of this component can be obtained from the co-pending application mentioned above. However, it will be appreciated by those skilled in the art that because the delay unifier is specifically included to unify the delays associated with multiple input variables, all of the control and delay functions are configured as matrices.

As illustrated in FIG. 3, an adaptive predictor 328 receives the mismatch signal $\epsilon$ and produces an adaptive prediction feedback signal $\epsilon_{pred}$. However, rather than feeding the adaptive prediction feedback signal directly to a comparator for subtractive combination with a setpoint reference, the adaptive prediction feedback signal is fed through controller 332, labelled "$Q_{FB}$", of the feedback path.

Having described exemplary control system configurations in accordance with the present invention, a more detailed description will now be provided of an adaptive predictor which can be used as the adaptive predictor 228 of FIG. 2 or the adaptive predictor 328 of FIG. 3.

FIG. 4 illustrates an exemplary embodiment of the adaptive predictor 228/328. In the exemplary FIG. 4 embodiment, the mismatch signal $\epsilon$ is supplied via a first path to an optional adder 402. The mismatch signal $\epsilon$ is also supplied via an optional path 404 through an optional slow/fast filter 405 and an optional amplifier 406 to a second input of the adder 402. In the adder 402, the output from the optional path 404 is subtractively combined with the mismatch signal $\epsilon$.

The optional slow/fast filter 405 can be configured in the manner described in co-pending U.S. application No. (Attorney Docket No. 018028-175) entitled "METHOD AND APPARATUS FOR NONLINEAR EXPONENTIAL FILTERING OF SIGNALS" and filed concurrently herewith, the contents of which are hereby incorporated by reference in their entirety. For purposes of describing exemplary embodiments of the present invention, it is only necessary to understand that the slow/fast filter 405 can be included to further enhance an ability of the adaptive predictor to provide both steady state tracking and fast tracking.

Generally speaking, the optional slow/fast filter 405 ignores changes in the mismatch signal $\epsilon$ which have amplitudes within a given deadband, but responds to changes of the mismatch signal $\epsilon$ which are outside the deadband. Of course, those skilled in the art will appreciate that the thresholds used to distinguish values of $\epsilon$ to which no response is provided versus values of $\epsilon$ to which a quick response is provided can be empirically established by the user. If, for example, a deadband associated with the filter is set wide enough, the adaptive predictor will only respond when the process transitions from a first steady state to another steady state, and will not respond to noise and other external disturbances. The slow/fast filter 405 will be described more fully with respect to FIG. 9A since this feature, in conjunction with adder 402, constitutes an optional feature which can be used in conjunction with exemplary embodiments of the present invention.

Where the optional path 404 is not used, a mismatch signal $\epsilon$, such as the mismatch signal shown in FIG. 5A is supplied to an adaptive prediction block 408. In accordance with exemplary embodiments, the adaptive prediction block 408 predicts variations in the mismatch signal from its center reference. As those skilled in the art will appreciate, variations can be predicted around any center value.

Assume, for example, that the mismatch signal possesses a repetitive disturbance component centered around an arbitrary value. Referring to the exemplary waveform of FIG. 5A, the mismatch signal $\epsilon$ is illustrated as a reasonably repetitive noise component centered around a value of 50. The units by which $\epsilon$ is defined can be arbitrary, and for purposes of the present invention, will be considered any engineering unit.

The supply of the mismatch signal $\epsilon$ to the optional slow-fast filter 405 results in the production of an output signal from adder 402 that is centered about 0, rather than the value of 50 shown in the FIG. 5A example. That is, the siow/fast filter 405 separates the center value out of the FIG. 5A waveform to produce a waveform as shown in FIG. 5B. By subtractively combining the output from the optional path 404 (i.e., the FIG. 5B waveform) from the mismatch signal $\epsilon$ (i.e., the FIG. 5A waveform), an output from the adder 402 will correspond to the mismatch signal less the center value as illustrated in FIG. 5C. That is, subtractively combining the waveforms of FIGS. 5A and 5B results in a centering of the mismatch signal about zero. The FIG. 5C waveform is referenced herein as a trimmed mismatch signal. The output form the adder 402 is then supplied to the adaptive prediction block 408.

In accordance with exemplary embodiments, the optional slow/fast filter 405 enables the adaptive predictor 328 to track changes in the centering value of the mismatch signal $\epsilon$ very rapidly. For example, if the centering value 50 of FIG. 5A were to transition to 70, the inclusion of the optional path 404 enables the adaptive predictor 328 to track this change very accurately. The use of a separate slow/fast filter 405 to produce a trimmed mismatch signal enables the adaptive prediction block 408 to focus solely on predicting changes in the mismatch signal which are centered around zero. Such a feature reduces or eliminates the possibility that the use of adaptive prediction feedback will produce a momentary erroneous signal due to unpredictable behavior, such as a sudden step disturbance. However, if desired, the adaptive prediction block can receive the FIG. 5A mismatch signal as an input (i.e., where the optional path 404 is not used), in which case the response to any steady state changes will occur more slowly unless they follow a repeatable pattern which can be identified and tracked by the adaptive prediction block.

An output from the adaptive prediction block 408 is supplied to an optional adder 410. The adder 410 also receives an output from the optional path 404 so that changes in the steady state of the mismatch signal $\epsilon$ as detected by the optional path 404 can be combined with predicted changes of the mismatch signal $\epsilon$ from the adaptive prediction block 408. The result is an output from the adder 410 which represents a prediction of the mismatch signal $\epsilon$ that takes steady state changes into account.

An exemplary embodiment of the adaptive prediction block 408 is illustrated in FIG. 6. Referring to the exemplary FIG. 6 embodiment, the adaptive prediction block 408 receives a mismatch signal $\epsilon$, such as the exemplary FIG. 5A waveform "x+y", or receives the trimmed mismatch signal, such as the exemplary FIG. 5C waveform "x", as a first input 602. Further, the adaptive prediction block 408 can receive a user set adaptive gain value as a second input 604. As those skilled in the art will appreciate, both the first input 602 and the second input 604 can be scalars or vectors. Where they are vectors, they include multiple components to account for multiple controlled variables of the controlled process (e.g., three values of $\epsilon$ and three user set adaptive gains for each of basis weight, moisture content and ash). Demultiplexers 606 and 608 can be provided so that the adaptive prediction block 408 can process the inputs associated with each controlled variable as separate scalars. For example, where three parameters are to be controlled, three separate processors 610, 612 and 614 can be provided, one processor being provided for each of the three controlled variables.

The user set adaptive gain can, for example, with a normalized least mean square (NLMS) approach, be set between zero and one according to any guideline established by the operator. For example, the user set adaptive gain can be selected as a function of noise present in the process. For a high level of noise, the user set adaptive gain can be set closer to zero, while for low noise, it can be set closer to one. In accordance with exemplary embodiments, the user set adaptive gain can be set at or around 0.5, and decreased if the process is determined to be noisier than expected. Those skilled in the art will appreciate that as the user set adaptive gain is increased closer to one in a nearly noiseless environment, speed with which the control system can track (i.e., predict) changes in the mismatch signal will be increased.

The three separate processors 610, 612 and 614 each receive the mismatch signal $\epsilon$ (or the trimmed mismatch signal) and a user set adaptive gain for each of the three control setpoints. In accordance with exemplary embodiments, the processors implement any user specific analysis for predicting a future value of the mismatch signal $\epsilon$ (or the trimmed mismatch signal) based on past performance. In accordance with an exemplary embodiment, each of the three processors is configured as a normalized least mean square (NLMS) processor. The use of a least mean square (LMS) stochastic approach is well known in adaptive signal processing and described for example in B. Widrow and S. Stearns, "Adaptive Signal Processing", Prentice Hall, 1985; and a normalized least mean square (NLMS) processing is described in G. C. Goodwin and K. S. Sin, "Adaptive Filtering, Prediction and Control", Prentice Hall, 1984, the contents of which are hereby incorporated by reference in their entireties. Each of the processors predicts the mismatch signal $\epsilon$ (or the trimmed mismatch signal) at some number of time units into the future. As those skilled in the art will appreciate, the time into which a prediction is made can be different for each of the controlled variables. For example, the basis weight can be predicted two minutes into the future, the moisture content can be predicted 1.5 minutes into the future, and the ash can be predicted one minute into the future.

Once the mismatch signal $\alpha$ (or the trimmed mismatch signal) is predicted, outputs from three processors are supplied to multiplexers 616 and 618 for recombination into vector quantities. The output from the multiplexer 616 constitutes a prediction of the future mismatch signal $\epsilon$ (or the trimmed mismatch signal) for all three controlled variables.

A more detailed illustration of an exemplary one of the FIG. 6 processors, such as processor 610, is illustrated in FIG. 7. The mismatch signal $\epsilon$ (or the trimmed mismatch signal) is supplied via an optional amplifier 702 to three locations: (1) an adder 704, (2) a prediction horizon block 706 associated with a tapped delay line block 708; and (3) a tapped delay line block 710. The processor 610 functions to predict the input signal (e.g., the mismatch signal $\epsilon$) at some point in the future (e.g., at a time $T_D$ from the current time $T_0$; i.e., $T_0+T_D$). Each of the tapped delay line blocks can be considered processors (e.g., digital signal processors) and/or storage elements for storing a set number of data points of the input signal. For purposes of the following discussion, the input signal will be described as the trimmed mismatch signal, although the mismatch signal $\epsilon$ could also be used.

The tapped delay line block 710 stores a user set number of data points associated with a first time period, while the tapped delay line block 708 stores a user set number of such data points for a second time period. In accordance with an exemplary embodiment, the tapped delay line block 710 stores a set number of data points (e.g., 10 data points) prior to and including the current time $T_0$. The tapped delay line block 708 stores a similar number of data points from, for example, a different time period (e.g., 10 data samples from a time period of say $T_0$-$T_D$-9 up to $T_0$-$T_D$). For the tapped delay line block 708 to store an earlier set of data points (i.e., a set of data points of the FIG. 5C waveform which occurred at a point earlier in time than the data points stored in the tapped delay line block 710), the (additional) time delay represented as the prediction horizon block 706 is included in the path between the first input 602 and the tapped delay line block 708.

In the exemplary FIG. 7 embodiment, a user set bias 712 and a user set bias 714 can be associated with multiplexers 716 and 718 to allow the capture of bias components in the signal, if desired.

In general, the FIG. 7 processor operates to use the earlier set of data samples stored in the tapped delay line block 708 to "predict" the current value of the trimmed mismatch signal at time $T_0$. Because the current value of the trimmed mismatch signal at time $T_0$ is already known, a difference between the "predicted" value and the current value at time $T_0$ can be used to adaptively modify coefficients used in the prediction process. Once modified, these coefficients can be used to operate upon the more recent set of data samples stored in the tapped delay line block 710 to provide an accurate prediction of the trimmed mismatch signal at a future time $T_0+T_D$.

Accordingly, an output from the tapped delay line block 708 is supplied to a coefficient adjusting block 720, where coefficients used by prediction blocks 722 and 728 are stored and updated. A "prediction" of the trimmed mismatch signal at time $T_0$ is performed at block 722 using the set of prediction coefficients stored in the coefficient adjust block 720. The "predicted" value of the trimmed mismatch signal at time $T_0$ is supplied to the adder 704, wherein it is compared against the current value to produce an error signal "e" on signal path 724. If desired, the predicted current value can be supplied to an output 726 for optional display purposes. The error signal on signal path 724 is supplied back to the coefficient adjusting block 720, such that the coefficients stored therein can be adjusted to reduce future errors in predicting the trimmed mismatch signal.

The coefficients of the coefficient adjusting block 720 are collectively stored as weighted filter coefficients $\theta$ in the normalized least mean square (NLMS) adaptation vector equation as described in the aforementioned Goodwin et al document. Once modified, the weighted filter coefficients from the coefficient adjusting block 720 can be used to process the more recent set of data points stored in the tapped delay line block 710 into a predicted future value for the trimmed mismatch signal. More particularly, a multiplication block 728 performs the following calculation:

$$\hat{\epsilon}_{pred} + \underline{\Phi}' \cdot \underline{\theta}$$

wherein: $\underline{\Phi}'$ corresponds to the transpose of the vector $\underline{\Phi}$ which is the output of block 718. The multiplication performed by block 724 is identical to that of block 722, with the exception that block 722 uses different inputs. Of course, those skilled in the art will appreciate that a single processor can be used to implement all functions of FIG. 7.

The process of modifying the coefficients in the coefficient adjusting block 720 can be performed sequentially for the data samples stored in the tapped delay line block 708 as new data points arrive.

FIG. 8 illustrates an exemplary embodiment of the coefficient adjusting block 720. In FIG. 8, the error "e" on signal path 724 of FIG. 7 is represented as input 802. The output from the tapped delay line block 708 is represented as input 804 (i.e., a regression vector Φ of past data points). The product of inputs on signal paths 802 and 804 form the negative gradient (block 806) indicating a direction along which one can minimize the square of the error signal on signal path 724 of FIG. 7. That is, the gradient block 806 implements the equation:

$$-\frac{1}{2}\frac{de^2}{d\theta} = \Phi e$$

wherein Φ is the regression vector associated with the data points received from tapped delay line 708. The regression vector input on signal path 804 is also supplied to a normalization block 808 which normalizes the regression vector according to the following:

$$\frac{\Phi}{\delta + \Phi'\Phi}$$

wherein Φ' constitutes the transpose of Φ which is used to determine the inner product Φ'Φ. The value δ is assigned a small positive value to avoid division by 0. The outputs from the gradient block 806, the normalization block 808 and the adaptive gain input 604 are supplied to a multiplication block and to a (−) update block 812 whereby an updated set of weighted filter coefficients θ is determined as follows:

$$\theta \leftarrow \theta + \mu \frac{\Phi}{\delta + \Phi'\Phi} e$$

wherein $0<\mu<1$, and $0<\delta<<1$. Updated values of the weighted filter coefficients are determined and stored as an updated state variable "x" in the θ update block 812 and output.

Although the foregoing prediction has been described in the context of a normalized least mean square (NLMS) prediction, those skilled in the art will appreciate that any prediction-based methodologies can be implemented in the processors of FIG. 6. For example, any statistical processing algorithm readily available in the art can be used as well, including the recursive least squares (RLS) approach as described in the Goodwin et al document mentioned previously, and including alternate approaches as described in K. M. Tao, "Statistical Averaging and PARTAN—some alternatives to LMS and RLS," IEEE Int. Conf. Acoustics, Speech and Signal Processing, 1992, pp. IV-25–IV-28.

As mentioned previously, where a process being controlled also includes a mismatch signal which is likely to undergo steady state changes, the optional FIG. 4 signal path 404 can be included. Although the aforementioned co-pending U.S. Application mentioned in conjunction with FIG. 4 describes alternate configurations of a slow/fast filter which can be used as the filter 405, a brief discussion of a basic filter suitable for use in conjunction with exemplary embodiments of the basic filter suitable for use in conjunction with exemplary embodiments of the present invention will be provided.

Referring to FIG. 9A, an exemplary embodiment of the optional slow/fast filter 405 for centering the mismatch signal ε around a value of zero is illustrated. In FIG. 9A, an input labelled "$y_K$" represents the signal to be filtered, while an output of the filter is labelled "$\hat{y}_K$". The output from the filter is passed through a delay 902 (e.g., a one unit delay) to produce a delayed version of "$\hat{y}_K$" as the signal "$\hat{y}_{K-1}$".

In the exemplary FIG. 9A embodiment, the filter (excluding block 906) is configured to implement the equation:

$$\hat{y}_k = \beta(\hat{y}_{k-1} - Y_k) + Y_k$$

This equation corresponds to an implementation of exponential filter. To implement the foregoing equation, the input "$Y_K$" and the feedback signal "$\hat{y}_{k-1}$" are supplied to a comparator 904 to produce a difference between the two signals. However, in contrast to a conventional exponential filter, the exemplary slow/fast filter of FIG. 9A includes a dead zone 906. The dead zone, in accordance with exemplary embodiments, is configured to produce a zero output when the differential output of comparator 904 is within a given deadband, while applying gain to the differential output of comparator 904 when the difference is outside of the deadzone.

FIG. 9B illustrates an exemplary transfer function of the deadzone 906. As illustrated in FIG. 9B, when the differential output of comparator 904 is in a deadband defined by −b to b, the output from the deadzone is zero. However, when the differential output of comparator 904 is outside the deadband, the output from the deadzone basically follows the differential input with a lag that corresponds to b (or −b for negative outputs of comparator 904). As a result of this function, the filter 405 will respond to transients, such as those which occur during a step transition, so that changes in steady state can be (rapidly) tracked, but will largely ignore small variations around steady state.

A comparator 908 subtractively combines the output from the deadzone with the differential output of comparator 904. Thus, the larger the output from the deadzone 906, the smaller the output from the comparator 908.

The output from comparator 908 is supplied to a multiplier 910, wherein it is multiplied with a filter coefficient β. Note that the filter coefficient β constitutes a coefficient of the conventional exponential filter set forth in the foregoing equation. As those skilled in the art will appreciate, the value of β is set at a value between zero and 1. For a β which is closer to one, steady state tracking can be provided with the filter. However, for a β which is closer to zero, the filter is better configured for tracking faster changes. Referring to the equation above, it is apparent that for a β that is approximately 1, the filter output will weigh the prior filter output "$\hat{y}_{K-1}$" more heavily in the equation, whereas for a β approximately equal to zero, the current input signal "$y_K$" which is to be filtered is weighted more heavily. In this latter case, the filter can be considered to have a short memory which is effected by the current input, whereas for a β of approximately 1, the filter can be considered to have a long memory since it weights the past filtered signal more heavily.

The output from the multiplier 910 is supplied to an adder 912, wherein the output from the multiplier 910 is combined with the input signal "$y_K$" to implement the equation mentioned above. As mentioned previously with respect to FIG. 4, by producing the output from the filter 405 as an input to the comparator 402, the trimmed mismatch signal of FIG. 5C can be produced as an input to the prediction block 408.

To highlight features achieved in accordance with exemplary embodiments of the present invention, FIG. 10A illustrates waveforms associated with three controlled variables in a control system, which does not include adaptive prediction feedback. The three controlled variables illustrated in FIG. 10A are associated with, for example, a paper making process, wherein the control system is a two degree of freedom internal model-based control system (e.g., such as that of FIG. 3) but which does not include adaptive prediction feedback. In contrast, FIG. 10B illustrates a significant reduction in the oscillatory nature of the control variables when adaptive predictive feedback as described, for example, with respect to FIG. 3 is utilized.

FIGS. 11A and 11B show that a reduction in actuator activity can be achieved in accordance with exemplary embodiments of the present invention. For example, FIG. 11A illustrates the actuator activity associated with three controlled variables in a paper making process using a control system such as that described with respect to FIG. 10A. In contrast, FIG. 11B illustrates the significant reduction in actuator activity which can be achieved by including an adaptive prediction feedback in accordance with the present invention. In the FIG. 10A, 10B and 11A, 11B illustrations, the values of amplitude shown on the vertical axis can be in any engineering unit, and the time base along the horizontal axis in each of the figures is arbitrary.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for controlling a process comprising:
   means for receiving at least one setpoint reference signal;
   means for modeling a process to be controlled, and for producing a predicted process output signal in response to said at least one setpoint signal, said at least one set point reference signal being a vector of multiple control variables in said process to be controlled; and
   means for producing an adaptive predictive feedback signal as a predicted difference between said predicted process output signal and an actual process output signal.

2. Apparatus for controlling a process comprising:
   means for receiving at least one setpoint reference signal;
   means for modeling a process to be controlled, and for producing a predicted process output signal in response to said at least one setpoint signal; and
   means for producing an adaptive predictive feedback signal as a predicted difference between said predicted process output signal and an actual process output signal, wherein said producing means further includes:
     means for centering a signal corresponding to a difference between said predicted process output signal and said actual process output signal around zero.

3. Apparatus according to claim 2, wherein said centering means further includes:
   means for establishing a dead zone during which said difference between said predicted process output signal and said actual process output signal remains zero.

4. Apparatus for controlling a process comprising:
   means for receiving at least one setpoint reference signal;
   means for modeling a process to be controlled, and for producing a predicted process output signal in response to said at least one setpoint signal; and
   means for producing an adaptive predictive feedback signal as a predicted difference between said predicted process output signal and an actual process output signal wherein said producing means further includes:
     at least one processor for implementing a stochastic calculation.

5. Apparatus according to claim 4, wherein said producing means receives a difference between said predicted process output signal and an actual process output signal as an input.

6. Apparatus according to claim 5, wherein said at least one processor further includes:
   means for sampling said difference between said predicted process output signal and said actual process output signal during a first period of time and during a second period of time; and
   means for using samples acquired during said first period of time to produce a predicted difference between said predicted process output signal and the actual process output signal.

7. Apparatus according to claim 6, wherein said at least one processor further includes:
   means for comparing said difference between said predicted process output signal and said actual process output signal with the predicted difference to produce an error signal; and
   means for updating coefficients of said at least one processor in response to said error signal.

8. Apparatus according to claim 7 further comprising:
   means for using said updated coefficients and samples acquired during said second period of time to produce said adaptive prediction feedback signal.

9. Apparatus according to claim 1, wherein said producing means receives a difference between said predicted process output signal and an actual process output signal as an input.

10. Method for controlling a process comprising: the steps of:
    receiving at least one setpoint reference signal;
    modeling a process to be controlled, and producing a predicted process output signal in response to said at least one setpoint signal, wherein said at least one setpoint reference signal is a vector associated with multiple control variables of said process to be controlled; and
    producing an adaptive predictive feedback signal as a predicted difference between said predicted process output signal and an actual process output signal.

11. Method for controlling a process comprising the steps of:
    receiving at least one setpoint reference signal;
    modeling a process to be controlled, and producing a predicted process output signal in response to said at least one setpoint signal; and
    producing an adaptive predictive feedback signal as a predicted difference between said predicted process output signal and an actual process output signal, wherein said step of producing further includes a step of:
      centering a signal corresponding to a difference between said predicted process output signal and said actual process output signal around zero.

12. Method for controlling a process according to claim 11, wherein said step of centering further includes a step of:
    establishing a deadzone during which said difference between said predicted process output signal and said actual process output signal remains zero.

13. Method for controlling a process according to claim 10, wherein said producing step further includes a step of:

receiving a difference between said predicted process output signal and an actual process output signal as an input.

14. Method for controlling a process comprising: the steps of:

receiving at least one setpoint reference signal;

modeling a process to be controlled, and producing a predicted process output signal in response to said at least one setpoint signal; and producing an adative predictive feedback signal as a predicted difference between said predicted process output signal and an actual process output signal, wherein said producing step further includes a step of: producing said adaptive predictive feedback signal using a stochastic calculation.

15. Method for controlling a process according to claim 14, wherein said producing step further includes a step of:

receiving a difference between said predicted process output signal and an actual process output signal as an input.

16. Method for controlling a process according to claim 15, further comprising steps of:

sampling said difference between said predicted process output signal and said actual process output signal during a first period of time and during a second period of time; and using samples acquired during said first period of time to produce a predicted difference between said predicted process output signal and the actual process output signal.

17. Method for controlling a process according to claim 16, further including steps of:

comparing said difference between said predicted process output signal and said actual process output signal with the predicted difference to produce an error signal; and updating said coefficients in response to said error signal.

18. Method for controlling a process according to claim 17 farther comprising a step of:

using said updated coefficients and data samples acquired during said second period of time to produce said adaptive predictive feedback signal.

\* \* \* \* \*

UNITED STATES PATENT AND TRADEMARK OFFICE
CERTIFICATE OF CORRECTION

PATENT NO. : 5,901,059
DATED     : May 4, 1999
INVENTOR(S) : TAO, et al.

It is certified that an error appears in the above-identified patent and that said Letters Patent is hereby corrected as shown below:

On Cover sheet, insert --Assignee: Honeywell-Measurex Corporation, Cupertino, California--

In Col. 16, line 17, replace "farther" with --further--.

Signed and Sealed this

Fifth Day of October, 1999

Attest:

Q. TODD DICKINSON

Attesting Officer

Acting Commissioner of Patents and Trademarks